United States Patent [19]

Widigs

[11] 4,274,772
[45] Jun. 23, 1981

[54] HOLDER FOR CHUCK KEY

[75] Inventor: Sven H. Widigs, Gustafs, Sweden

[73] Assignees: Lars-Gösta Brändström; Karl-Peter Brändström, both of Söderhamn, Sweden

[21] Appl. No.: 121,731

[22] Filed: Feb. 15, 1980

[30] Foreign Application Priority Data

Feb. 15, 1979 [SE] Sweden .................. 7901356

[51] Int. Cl.³ ............................................. B23B 45/00
[52] U.S. Cl. .................................. 408/241 R; 279/1 K
[58] Field of Search ...................... 279/1 K; 81/90 A; 408/241 R; 403/391, 400; 24/115 H, 116 R; 248/229

[56] References Cited

U.S. PATENT DOCUMENTS

| 2,263,277 | 11/1941 | Schumann | 279/1 K |
| 4,049,357 | 9/1977 | Hamlisch | 24/115 H X |
| 4,093,396 | 6/1978 | Widigs | 279/1 K |

FOREIGN PATENT DOCUMENTS

| 404598 | 7/1943 | Italy | 403/391 |
| 451463 | 9/1949 | Italy | 403/491 |
| 229151 | 1/1944 | Switzerland | 403/491 |

*Primary Examiner*—William R. Briggs
*Attorney, Agent, or Firm*—Irving M. Weiner; Pamela S. Burt; John L. Shortley

[57] ABSTRACT

A chuck key holder is arranged on a power supply means and rotatably carries a chuck key for adjusting the clamping jaws of a chuck on an electrically or pneumatically driven machine provided with the chuck, e.g. a hand-held drilling machine. The holder includes a channel for accommodating the lead and a mounting for the chuck key. The holder consists of a basic structure made up from two identically alike basic parts (11, 12), of which one (11) is turned 180° in relation to the other (12). In either basic part (11, 12) there is formed one half of the channel for the lead (15) and one half of the key mounting (16). Fastening means (21, 22) are arranged to keep the basic parts (11, 12) together.

4 Claims, 7 Drawing Figures

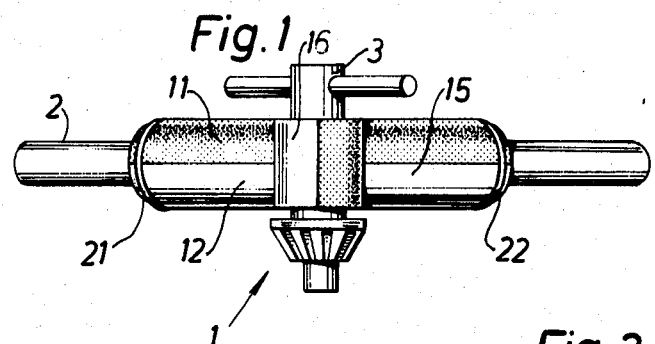
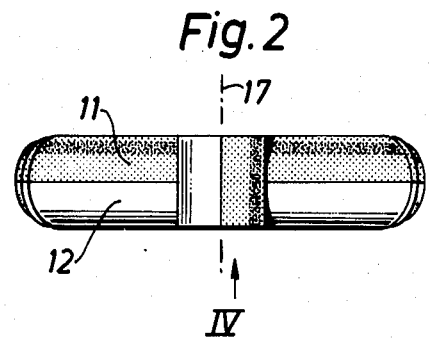
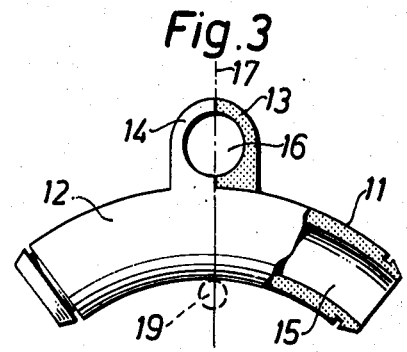
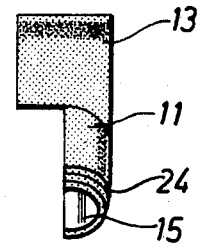
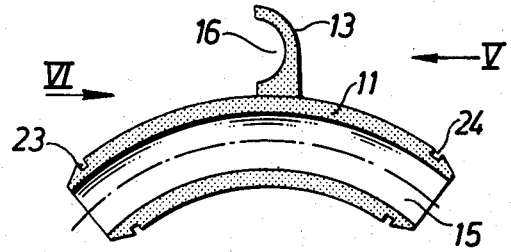
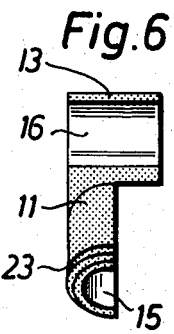
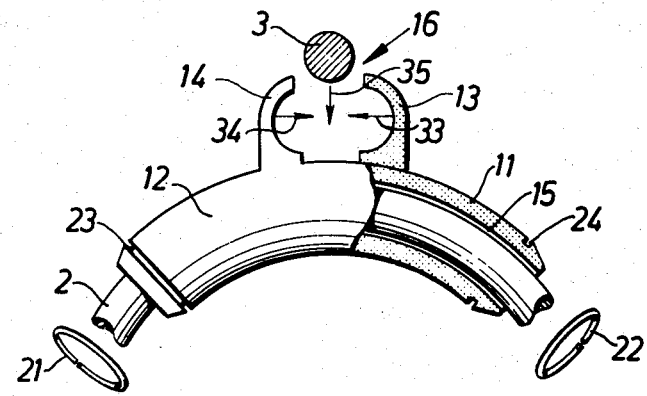

HOLDER FOR CHUCK KEY

The present invention relates to a holder for a chuck key, said holder being intended for attaching to the lead on an electric hand machine, equipped with a chuck for attaching different tools such as drills, rotating files, circular saw blades etc. When fixing tools into the chuck, the shank of the tool must be inserted between the widened jaws in the chuck, the jaws subsequently being tightened round the shank with the help of the chuck key.

For practical reasons, different kinds of chuck key holders have been proposed, which are attached to mains lead of the machine, and thus carry the key in such a way that it is easily available when it is needed for tightening or loosening tools in the machine chuck. Examples of such devices are apparent from the British Patent specification Nos. 785.300 and 508.002.

Common to all these chuck key holders is that they have open slots in the portions which are intended to receive the lead and key respectively, the lead and key being inserted into said slots when the device is used. This involves the risk that either the holder with the key, or the key by itself can come away from the lead so that the key is lost, due to unintentional application of force.

The above disadvantages are avoided with a device in accordance with the invention, by the holder having a basic structure consisting of two identically alike parts, one of which is turned 180° in relation to the other. In either basic part there is one half of a channel for the lead and one half of a seating for the chuck key, both basic halves being mutually connected to form the basic structure.

Both halves of the chuck key seating are formed in portions projecting from the basic parts and have complementarily engaging surfaces, preferably so that their common interface is flat and at right angles to the parting plane of the basic parts in the portions thereof wherein is formed the channel for the mains lead. The basic parts are preferably kept together by springs rings coacting with grooves in the ends of the parts, said grooves being formed for receiving the spring rings so that the parts are kept together. It is also advantageous for the lead channel to be curved, i.e. its centre line is curved.

The inventions will now be described in detail in connection to the appended drawing, where FIG. 1 shows the complete holder fixed onto a lead and carrying a chuck key, FIG. 2 shows the two details constituting the basic structure of the holder seen along the planes of symmetry of the holder, FIG. 3 is a side view of the basic portion in FIG. 2, FIG. 4 is one half of the holder basic structure, FIG. 5 is a view of the detail in FIG. 4 seen in the direction V, FIG 6 is a view of the same detail seen in the direction VI in FIG. 4 and FIG. 7 shows a stage in fitting the chuck key holder to the electrical lead of the machine.

In FIG. 1 the key holder is denoted by the numeral 1, and is fixed to a lead 2, said holder carrying a chuck key 3. The holder consists of two basic parts 11 and 12, two channels being formed, when they are assemled together, one channel 15 receiving the lead 2, and the other 16 constituting carrying means for the chuck key 3. Both details 11 and 12 are kept together at their outer end portions, of the holder along the lead, by two spring rings 21 and 22.

FIG. 2 shows both details 11 and 12 placed adjacent each other. The details are identically alike, but are formed such that when they are put together as shown in FIG. 2, with one detail rotated 180°, they form a basic structure symmetrical about the plane of symmetry of the lead. For the sake of clarity, one of the details 11 is shaded darker in FIG. 2, thus illustrating this relationship more clearly.

In FIG. 3 the basic structure of the holder is shown from one side, the right-hand portion of the nearest holder part 12 being cut away so that the right-hand end of the holder part 11 is clearly visible. In the example depicted, both basic halves form a channel 15 for the lead 2, the cross section of the channel being substantially circular, and the centre line thereof being arcuate. Gliding of the holder on the lead is counteracted by the channel being curved, said lead normally striving to maintain a relatively straight extension, due to its inherent stiffness. The holder can simultaneously serve as rupture protection for the lead when the machine is not in use, if the holder is placed on a support 19, e.g. as is indicated by dashed lines in FIG. 3. The holder thus serves as a bending protector for the lead so that the latter is not subjected to too abrupt bends.

A cylindrical hole or mounting 16, for receiving the shank portion of a chuck key 3, extends substantially perpendicular to the channel 15. The mounting is formed by portions 13 and 14 having semicircular recesses, said portions being formed on the basic parts 11 and 12, respectively. The assembled detail has a plane of symmetry 17 through the mounting 16 for the key 3.

Both identical basic parts 11, 12 are kept together by spring rings 21 and 22, so that both parts 11 and 12 are kept tightly against each other and function together as a single unit. The channel 15 and mounting 16 are dimensioned so that there is suitable clearance between the lead 2 and channel 15, as well as between the chuck key 3 and mounting 16.

FIG. 4 illustrates the basic part 11, seen in the direction IV denoted in FIG. 2. From the figure is seen the half of the channel 15 formed in the part, and half of the seating 16 for receiving the key 13, the seating being formed in the projection 13 from the part 11. The figure also illustrates the configuration of grooves 23 and 24, which are arranged for the ring springs 21 and 22, which keep the chuck key holder together. FIGS. 5 and 6 show the basic part illustrated in FIG. 4 from the directions V and VI shown in FIG. 4. The same numerical denotations have been used in these figures as in the previous figures.

FIG. 7 illustrates a stage in fixing the holder 1 onto the lead 2. In the figure, the basic part 12 is placed on the front side of the lead while the basic part 11 is placed on its furthermost side. The basic parts 11, 12 "overlap" such that the projecting portions 13 and 14, each forming a half of the mounting 16 for the key 3, have a distance between their mating faces which is sufficiently great for permitting the shank portion of the key 3 to be introduced between said portions 13 and 14 in the direction denoted by the arrow 35. When the key is put into position, the projecting portions 13 and 14 are moved in the respective directions of the arrows 33 and 34, to the position shown in FIG. 2, where both basic parts together form the complete lead channel 15 and key mounting 16, respectively. The spring rings 21 and 22, which are open, are snapped over the lead 2 on either side of the holder and are thereafter pushed into their grooves 23 and 24, for finally locking the base parts 11 and 12 into a rigid chuck key holder accommodating the lead 2 and key 3, as illustrated in FIG. 1.

By the device in accordance with the invention, a chuck key holder has been achieved for placing on a mains lead or supply cable to an electric or pneumatic hand machine, and which provides a positive and simple function, whereby the key is kept safely and cannot be lost or misplaced. By having the holder formed in the way disclosed in the patent claims, there is also obtained a very simple and cheap holder, since both details forming the structure of the holder are identical. This means that only a single mould or several identical moulds are needed to be formed in the production tool, which can furthermore be made very simple and consist soley of two integral tool halves without moving parts. The use of simple spring rings for keeping the base portions together further contributes to the provision of a cheap holder.

The described device only constitute an example. One skilled in the art will easily understand that other embodiments can be achieved, where base portions are antisymmetrically formed so that when one is turned 180° in relation to the other they complement each other to form a symmetric holder. For example, the dividing plane 17 between the base parts 11, 12 can be at an angle to the longitudinal plane of symmetry of the holder through the lead channel 15.

I claim:

1. A chuck key holder for arrangement on a flexible power supply lead to rotatably carry a chuck key for adjusting the clamping jaws of a chuck on an electrically or pneumatically driven machine, such as a handheld drilling machine, the holder including a channel for accommodating the power supply lead, and a mounting for the chuck key, characterized in that the holder has a basic structure consisting of two identically alike basic parts (11, 12), of which one (11) is turned 180° in relation to the other (12), there being formed in each part (11, 12) one half of the channel (15) for the lead and one half of the chuck key mounting (16), there also being fastening means arranged for keeping the basic parts (11, 12) together, each said holder basic part (11, 12) having a pair of surfaces adapted to slideably engage a mating oppositely facing pair of surfaces on the other basic part, and each basic part being slideable in respect to the other along said pairs of mating surfaces while a flexible lead of proper size is received therein, said chuck key mounting (16) being formed in portions (13, 14) projecting from said basic parts (11, 12), the common contact surfaces of the portions (13, 14) being perpendicular to the plane of partition for the basic parts (11, 12), in which is formed the channel (15) accommodating the lead (3), and facing each other, and formed in relation to each other and said pair of slideably engageable surfaces so as to limit the movement of said basic parts along the latter surfaces and to rotatably retain a chuck key when said portions 13, 14 engage, and attachment means comprising resilient rings (21, 22) receivable in mating grooves on said basic parts said grooves being positioned on the latter parts so as to be in proper relationship when said common contact surfaces of said key mounting portions are engaged.

2. A chuck key holder as claimed in claim 1, characterized in that the centre line of the channel (15) for receiving the lead (2) is curved.

3. A chuck key holder as claimed in claim 2 wherein said basic parts (11, 12) have mating curved sections on their exterior in planes parallel to a plane containing the center line of said channel adapted to support said holder and a lead therein on a support beneath said holder.

4. The chuck key holder of claim 3 wherein said key mounting portions project outwardly from their respective said basic parts oppositely with respect to the curvature of the curved sections.

* * * * *